US008200856B2

(12) United States Patent
Guo et al.

(10) Patent No.: US 8,200,856 B2
(45) Date of Patent: Jun. 12, 2012

(54) FLOW CONTROL FOR UNIVERSAL SERIAL BUS (USB)

(75) Inventors: Hongshi Guo, San Diego, CA (US); Jeffrey Alan Dyck, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 238 days.

(21) Appl. No.: 11/753,473

(22) Filed: May 24, 2007

(65) Prior Publication Data

US 2008/0028113 A1 Jan. 31, 2008

Related U.S. Application Data

(60) Provisional application No. 60/808,691, filed on May 25, 2006.

(51) Int. Cl.
*G06F 3/00* (2006.01)
*G06F 15/16* (2006.01)

(52) U.S. Cl. .......................................... 710/29; 709/233
(58) Field of Classification Search ................... 710/29; 709/233
See application file for complete search history.

(56) References Cited

U.S. PATENT DOCUMENTS

| 6,119,190 | A | 9/2000 | Garney |
| 6,311,294 | B1 | 10/2001 | Larky et al. |
| 6,434,643 | B1 | 8/2002 | Ejiri |
| 6,795,872 | B2 * | 9/2004 | Page et al. .......................... 710/8 |
| 7,007,110 | B2 | 2/2006 | Howard et al. |
| 2003/0217254 | A1 * | 11/2003 | Page et al. .......................... 713/2 |
| 2004/0203973 | A1 * | 10/2004 | Khan ............................. 455/517 |
| 2005/0044286 | A1 | 2/2005 | Lim et al. |
| 2007/0086421 | A1 * | 4/2007 | Hong et al. .................... 370/349 |

FOREIGN PATENT DOCUMENTS

| JP | 11296316 A | 10/1999 |
| JP | 2000269961 A | 9/2000 |
| KR | 20050021602 | 3/2005 |

OTHER PUBLICATIONS

Universal Serial Bus Specification Revision 2.0, Apr. 27, 2000.*
International Search Report—PCT/US07/069780, International Search Authority—European Patent Office—Nov. 30, 2007.
USB-Implementers Forum Inc: "Universal Serial Bus Specification—Rev. 2.0; Chapters 5, 8" Universal Serial Bus Specification, Apr. 27, 2000, XP002330584.
Written Opinion—PCT/US07/069760, International Search Authority—European Patent Office—Nov. 30, 2007.
European Search Report—EP11181269—Search Authority—Munich—Oct. 26, 2011.

* cited by examiner

*Primary Examiner* — Chun-Kuan Lee
*Assistant Examiner* — Farley Abad
(74) *Attorney, Agent, or Firm* — Howard Seo

(57) ABSTRACT

Techniques for performing flow control in Universal Serial Bus (USB) are described. In one design, a USB host sends token packets to a USB device to initiate data exchanges with the USB device. The USB device determines that it is incapable of exchanging data with the USB host, e.g., because there is no data to send or because its buffer is full or near full. The USB device then sends a "flow off" notification to the USB host to suspend data exchanges. The USB host receives the flow off notification and suspends sending token packets to the USB device. Thereafter, the USB device determines that it is capable of exchanging data with the USB host. The USB device then sends a "flow on" notification to the USB host to resume data exchanges. The USB host receives the flow on notification and resumes sending token packets to the USB device.

33 Claims, 7 Drawing Sheets

FLOW CONTROL FOR UNIVERSAL SERIAL BUS (USB)

The present application claims priority to provisional U.S. application Ser. No. 60/808,691, entitled "Optimized USB Flow Control Mechanism" filed May 25, 2006, assigned to the assignee hereof and incorporated herein by reference.

BACKGROUND

I. Field

The present disclosure relates generally to data communication, and more specifically to techniques for controlling data exchanges via USB.

II. Background

USB is a serial bus that is widely used to interconnect computers with external devices such as keyboards, mouse devices, printers, scanners, memory sticks, disk drives, digital cameras, webcams, etc. USB is also commonly used for other electronics devices such as personal digital assistants (PDAs), game machines, etc.

USB utilizes a host-centric architecture for data exchanges between a USB host and USB devices coupled to the USB host. The USB host may reside on a computer, and the USB devices may be external devices coupled to the computer via USB wire. In the host-centric architecture, the USB host controls communication with all USB devices. Whenever a new USB device couples to the computer, the USB host and the USB device exchange signaling to configure the USB device. Thereafter, the USB host may periodically send token packets to the USB device whenever the USB host desires to send data to, or receive data from, the USB device. The USB device may receive data from, or send data to, the USB host whenever token packets are issued by the USB host.

The USB host may start a transaction by sending a token packet to the USB device. Upon receiving the token packet, the USB device may send a negative acknowledgement (NAK) handshake packet if the USB device temporarily cannot send or receive data. Upon receiving the NAK from the USB device, the USB host may retry the NAK'ed transaction by sending another token packet at a later time.

NAK handshake packets may be used for flow control in USB. The USB device may send NAK handshake packets to adjust/throttle the data rate and prevent its buffers from underflowing or over-flowing. However, the NAK'ed transactions may consume a significant amount of USB bandwidth and power.

There is therefore a need in the art for techniques to more efficiently perform flow control in USB.

SUMMARY

Techniques for performing flow control in USB in order to reduce NAK'ed transactions and improve data performance and power efficiency are described herein. For flow control, a USB device may determine its capability to exchange data with a USB host and may send notifications for flow control based on its capability.

In one design, the USB host may (e.g., periodically) send token packets to the USB device to initiate data exchanges with the USB device (e.g., to send data to or receive data from the USB device). The USB device may determine that it is incapable of exchanging data with the USB host, e.g., because there is no data to send or because its buffer is full or near full. The USB device may send a "flow off" notification (e.g., on an interrupt pipe) to the USB host to suspend data exchanges. The USB host may receive the flow off notification and suspend sending token packets to the USB device. Thereafter, the USB device may determine that it is capable of exchanging data with the USB host. The USB device may then send a "flow on" notification to the USB host to resume data exchanges. The USB host may receive the flow on notification and resume sending token packets to the USB device. By suspending transmission of token packets during the time that the USB device is incapable of exchanging data, NAK'ed transactions may be reduced or avoided.

Various aspects and features of the disclosure are described in further detail below.

DETAILED DESCRIPTION

The flow control techniques described herein may be used for USB, other buses, polling-based input/output (I/O) systems, and other systems in which data is exchanged between entities. For clarity, the techniques are specifically described below for USB, which is covered in a publicly available document "Universal Serial Bus Specification," Revision 2.0, Apr. 27, 2000.

USB uses the following terminology:

Function—a USB device that provides a capability/task to a USB host,

Endpoint—a source or a sink of information in a communication flow between a USB device (or function) and a USB host, Pipe—a logical channel between a USB host and an endpoint on a USB device, and Transaction—delivery of service to an endpoint, which consists of a token packet, optional data packet, and optional handshake packet.

A USB device may have one or more functions, e.g., a webcam may have one function for video and another function for sound. Each physical USB device is identified by a unique 7-bit address assigned by a USB host. The USB host may support up to 127 physical USB devices with 127 different addresses of 1 to 127. A function may have one or more endpoints. Each endpoint is identified by a 4-bit endpoint number. For example, a function may have an IN endpoint that sends data to the USB host and an OUT endpoint that receives data from the USB host, where "IN" and "OUT" are from the perspective of the USB host.

Figure 1:
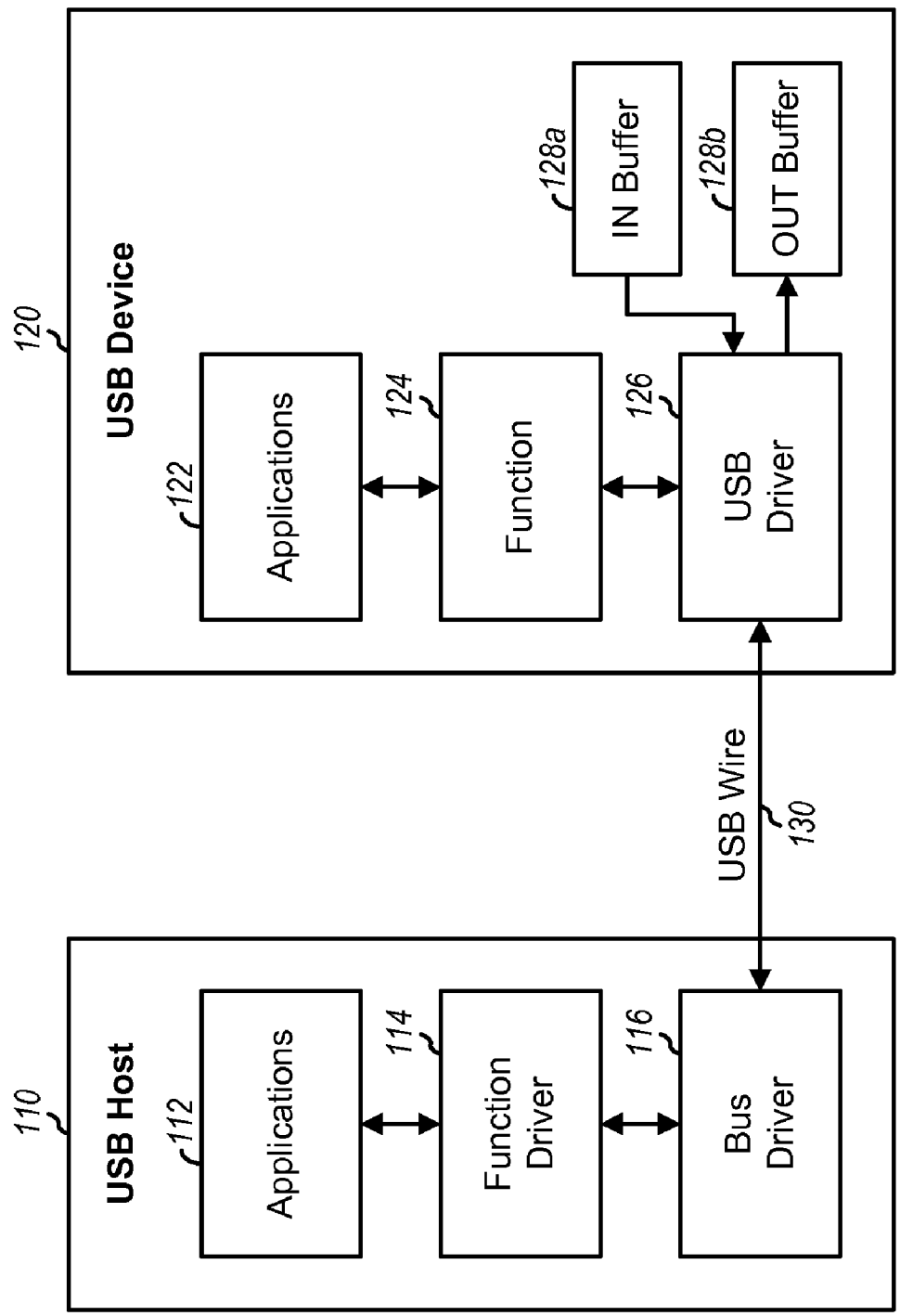
FIG. 1 shows a block diagram of a USB host and a USB device.

FIG. 1 shows a block diagram of a design of a USB host 110 and a USB device 120. In this design, USB host 110 includes applications 112, a function driver 114, and a bus driver 116. Applications 112 may comprise any application having data to exchange with USB device(s). Applications 112 may reside on USB host 110, as shown in FIG. 1, or may be part of a computer or some other electronics device within which USB host 110 resides. Function driver 114 manages data exchanges for functions of USB devices coupled to USB host 110. Function driver 114 interfaces with applications 112 and initiates transactions to send and/or receive data for the applications. Bus driver 116 supports packet exchanges with USB devices via a USB wire 130 and performs physical layer processing for the packet exchanges. Bus driver 116 may send and receive packets as directed by function driver 114.

In the design shown in FIG. 1, USB device 120 includes applications 122, a function 124, a USB driver 126, an IN buffer 128a, and an OUT buffer 128b. In general, USB device 120 may have one or more functions. For simplicity, the following description assumes that USB device 120 has a single function. Applications 122 may comprise any application having data to exchange with USB host 110. Function 124 interfaces with applications 122 and supports data exchanges with USB host 110 for the applications. USB driver 126 supports packet exchanges with USB host 110 via USB wire 130 and performs physical layer processing for the packet exchanges. IN buffer 128a stores data to be sent to USB host 110, and OUT buffer 128b stores data received from USB host 110.

FIG. 1 shows a specific design of USB host 110 and USB device 120. In general, a USB host may include the same or different modules than those shown in FIG. 1 for USB device 110. A USB device may also include the same or different modules than those shown in FIG. 1 for USB device 120. Each module may be implemented with hardware, firmware, software, or a combination thereof.

USB host 110 may initiate a transaction to receive data from an IN endpoint of function 124 at USB device 120 or to send data to an OUT endpoint of function 124. Different sequences of packets may be exchanged for different types of transaction. USB 2.0 supports three different speed settings—low-speed covering up to 1.5 megabits/second (Mbps), full-speed covering up to 12 Mbps, and high-speed covering up to 480 Mbps. Different sequences of packets may be exchanged for OUT transactions for different speed settings.

Figure 2A:
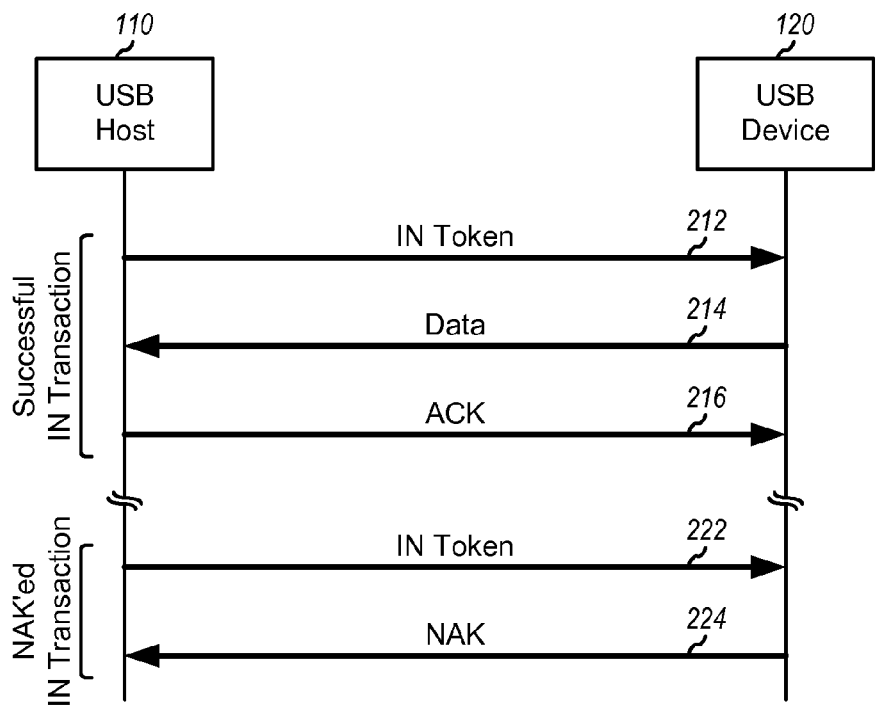
FIG. 2A shows IN transactions to read data from the USB device.

FIG. 2A shows IN transactions to read data from USB device 120 for all three speed settings. For an IN transaction, USB host 110 sends an IN token packet, which is a packet requesting to read data from USB device 120 (step 212). The IN token packet contains the address of USB device 120 and the IN endpoint number. USB device 120 receives the IN token packet, determines that it has data to send and can send the data, and sends a data packet to USB host 110 (step 214). USB host 110 receives the data packet, determines that the packet is received correctly, and sends an acknowledgement (ACK) handshake packet (step 216). Steps 212, 214 and 216 constitute a successful IN transaction.

For another IN transaction at a later time, USB host 110 sends an IN token packet to the IN endpoint of function 124 at USB device 120 (step 222). USB device 120 receives the IN token packet, determines that it has no data to send or that it cannot send the data, and sends a NAK handshake packet to USB host 110 (step 224). USB host 110 receives the NAK packet and may retry the IN transaction at a later time. Steps 222 and 224 constitute a NAK'ed IN transaction in which two overhead packets (but no data packet) are exchanged between USB host 110 and USB device 120.

Figure 2B:
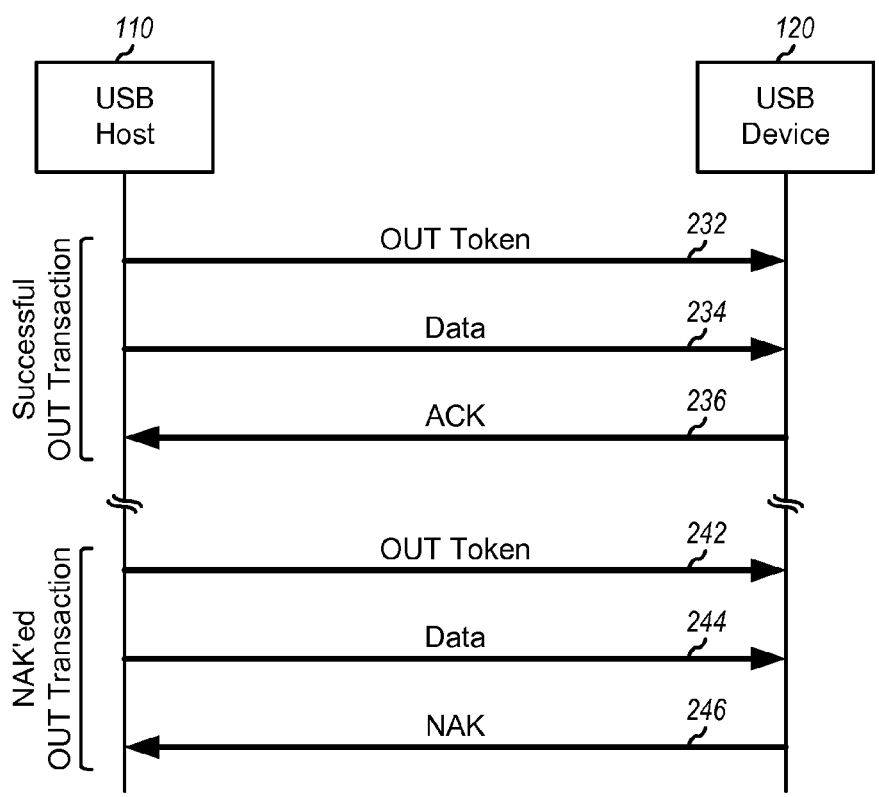
FIGS. 2B and 2C show OUT transactions to send data to the USB device.

FIG. 2B shows OUT transactions to send data to USB device 120 for low-speed and full-speed. For an OUT transaction, USB host 110 sends an OUT token packet, which is a packet requesting to write data to USB device 120 (step 232). The OUT token packet contains the address of USB device 120 and the OUT endpoint number. USB host 110 then sends a data packet to USB device 120 right after the OUT token packet, without waiting for a reply from USB device 120 (step 234). USB device 120 receives the OUT token packet, receives the data packet, determines that the packet is received correctly, and sends an ACK handshake packet (step 236). Steps 232, 234 and 236 constitute a successful OUT transaction for low-speed or full-speed.

For another OUT transaction at a later time, USB host 110 sends both an OUT token packet and a data packet to the OUT endpoint of function 124 at USB device 120 (steps 242 and 244). USB device 120 receives the OUT token packet and the data packet, determines that it cannot receive data, and sends a NAK handshake packet (step 246). USB host 110 receives the NAK packet and may retry the OUT transaction at a later time. Steps 242, 244 and 246 constitute a NAK'ed OUT transaction in which two overhead packets and a data packet are exchanged between USB host 110 and USB device 120 for an unsuccessful transfer.

Figure 2C:
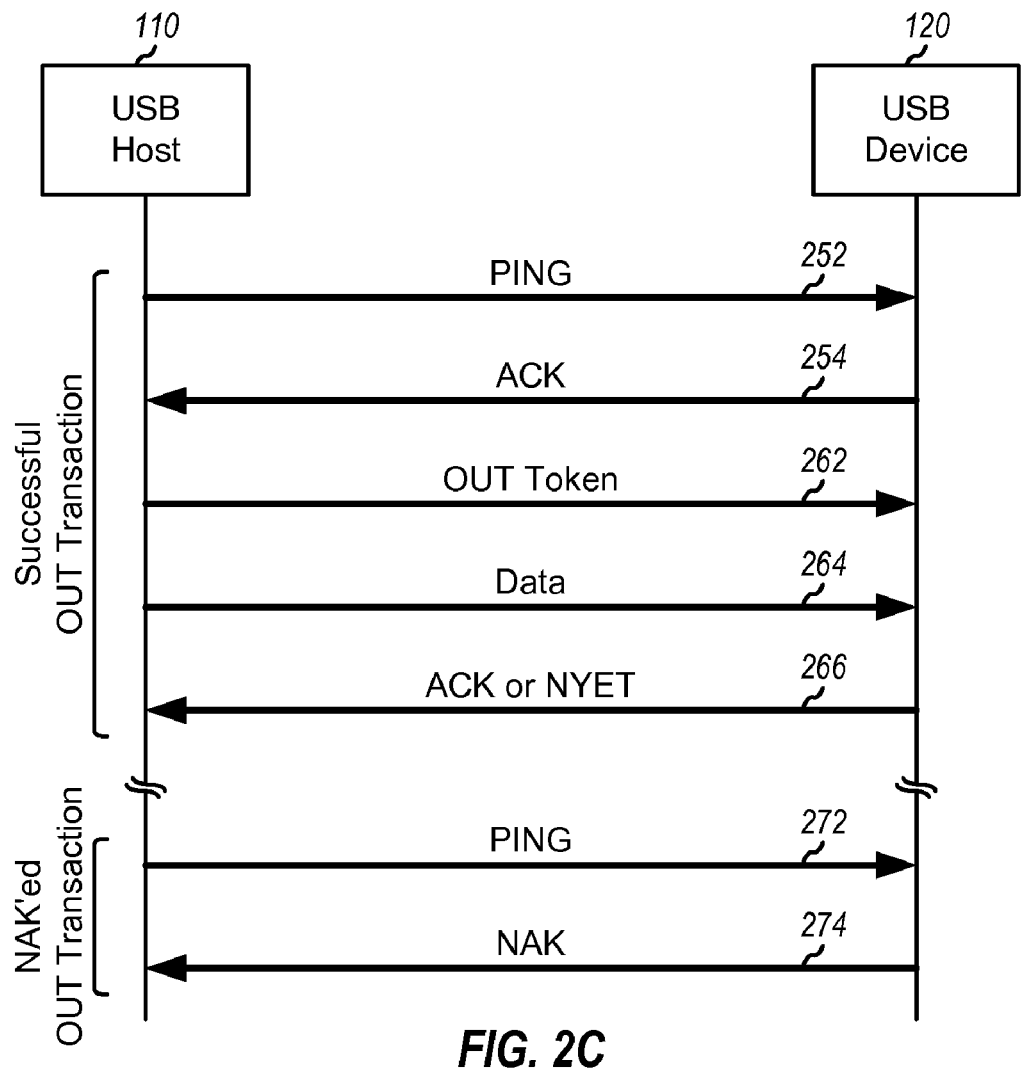

FIG. 2C shows OUT transactions to send data to USB device 120 for high-speed. For an OUT transaction, USB host 110 sends a PING token packet, which is a packet querying the capability of USB device 120 to receive data (step 252). A PING packet is categorized as a special packet in USB, but is referred to as a token packet herein. The PING token packet in step 252 contains the address of USB device 120 and the OUT endpoint number. USB device 120 receives the PING token packet and sends an ACK handshake packet if it is capable of receiving data (step 254). Upon receiving the ACK, USB host 110 sends an OUT token packet and a data packet to USB device 120 (steps 262 and 264), and USB device 120 returns an ACK or an NYET handshake packet (step 266). Steps 252 to 266 constitute a successful OUT transaction for high-speed.

For another OUT transaction at a later time, USB host 110 sends a PING token packet to USB device 120 (step 272). USB device 120 receives the PING token packet, determines that it cannot receive data, and sends a NAK handshake packet (step 274). USB host 110 receives the NAK packet and may retry the OUT transaction at a later time. Steps 272 and 274 constitute a NAK'ed OUT transaction in which two overhead packets are exchanged between USB host 110 and USB device 120 for an unsuccessful transfer.

As shown in FIGS. 2A and 2B, USB host 110 controls data exchanges with USB device 120. USB host 110 initiates both IN transactions to read data from USB device 120 and OUT transactions to write data to the USB device. USB host 110 may send IN token packets periodically based on data requirements of USB device 120 and the available USB bandwidth. USB host 110 may send OUT or PING token packets whenever it has data to send to USB device 120. USB host 110 typically blindly sends the IN token packets and does not know a priori whether USB host 110 has any data to send or can send the data. USB host 110 also typically sends the OUT or PING token packets when it has data to send and does not know a priori whether or not USB host 110 can receive data.

Figure 3:
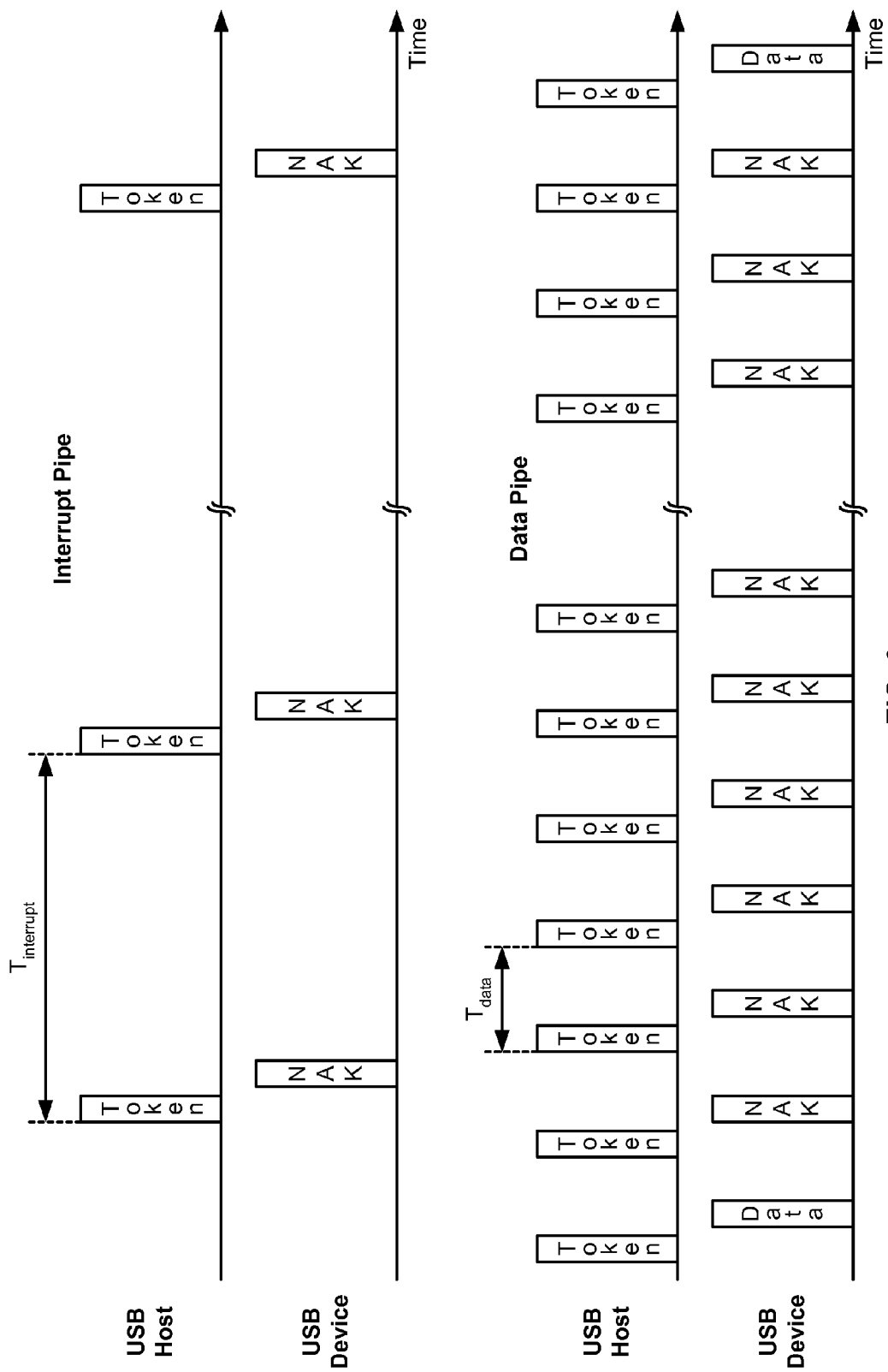
FIG. 3 shows transmissions of token packets and NAK'ed transactions without flow control.

FIG. 3 shows an example of packet exchanges between USB host 110 and USB device 120. In this example, USB device 120 has an interrupt pipe and a data pipe with USB host 110. In USB, a pipe is typically associated with a specific function, a specific endpoint, and a specific direction. An interrupt pipe may be considered as a signaling channel that may be used to send signaling information, e.g., flow control information. In general, a USB device may or may not have an interrupt pipe. A data pipe may be considered as a data channel that may be used to send data traffic. A data pipe may be a bulk pipe or an isochronous pipe in USB and may be for the IN or OUT direction. A pipe is unidirectional and may carry information for either the IN direction from USB device 120 to USB host 110 or the OUT direction from USB host 110 to USB device 120. In the example shown in FIG. 3, the interrupt pipe and the data pipe are both for the IN direction.

An endpoint for the interrupt pipe may specify a desired bus access period for this pipe during setup with USB host 110. The bus access period for the interrupt pipe may be selected from one of the following ranges:

10 to 255 milliseconds (ms) if the endpoint supports low-speed,
1 to 255 ms if the endpoint supports full-speed, and
0.125 to $0.125 \times 2^M$ ms if the endpoint supports high-speed, where $M \leq 15$.

USB host 110 may send IN token packets for the interrupt pipe to USB device 120 at a period of $T_{interrupt}$, which may be equal to or less than the bus access period for the interrupt pipe. Whenever an IN token packet is received for the interrupt pipe, USB device 120 may send either a data packet with control information or a NAK handshake packet to USB host 110, e.g., as shown in FIG. 2A.

USB host 110 may send IN token packets for the data pipe to USB device 120 at a period of $T_{data}$, which may be determined based on the data requirements of USB device 120, the available USB bandwidth, etc. $T_{data}$ may be much shorter than $T_{interrupt}$ and may be on the order of microseconds (μs) for full-speed and high-speed. Thus, USB host 110 may send many (e.g., hundreds of) IN token packets for the data pipe for each IN token packet sent for the interrupt pipe. Whenever an IN token packet is received for the data pipe, USB device 120 may send either a data packet with traffic data or a NAK handshake packet to USB host 110. For simplicity, ACK handshake packets are not shown in FIG. 3.

As shown in FIG. 3, there may be many NAK'ed transactions for the data pipe. The NAK'ed transactions may consume a significant amount of USB bandwidth and may reduce the maximum effective data throughput for other pipes on the USB wire. The NAK'ed transactions may also consume power in USB host 110 and USB device 120 without providing any beneficial result.

In an aspect, flow control is performed for USB in order to reduce or avoid NAK'ed transactions. This may improve data performance and power efficiency. For flow control, USB device 120 may determine its capability to exchange data with USB host 110. USB device 120 may send notifications to USB host 110 for flow control based on this determined capability.

In general, USB device 120 may send various types of information to USB host 110 for flow control. For example, the following information may be sent for flow control:

Flow off notification—indication to suspend transactions/data exchanges,
Flow on notification—indication to resume transactions/data exchanges,
Data rate—indicate rate of traffic data to exchange,
Buffer size—indicate amount of data to send in the IN or OUT direction,
Token rate—indicate rate of token packets to be sent by USB host 110,
Timeout—used to periodically determine whether or not to enable flow control,
N-shot indication—indication to perform N data transfers and then stop, where $N \geq 1$,
Control duration—indicate duration for which flow control is applied.

Flow control information is sent on different pipe than the pipe being flow controlled.

In one design, flow control is performed based on flow off and flow on notifications, which may also be referred to by other names. In this design, when USB device 120 determines that it is incapable of exchanging data for a particular pipe, USB device 120 sends a flow off notification to USB host 110 to suspend transactions on this pipe. Upon receiving the flow off notification, USB host 110 does not schedule transactions on the pipe, which then avoids waste of USB bandwidth due to NAK'ed transactions. When USB device 120 later determines that it is again capable of exchanging data for the suspended pipe, USB device 120 sends a flow on notification to USB host 110 to resume transactions on this pipe. Upon receiving the flow on notification, USB host 110 resumes transactions on the pipe. In this design, the flow off and flow on notifications are essentially requests to stop and start transactions on the pipe.

Flow control may be performed independently for each pipe at USB device 120. Since each pipe is unidirectional, flow control may be performed independently for the IN and OUT directions. Flow control may also be performed for a set of pipes that are "bundled" together, e.g., as a single logical unit.

USB device 120 may exchange data with USB host 110 on the upstream and/or downstream. Thus, exchanging data may refer to sending data to USB host 110 in the IN direction (or upstream) or receiving data from USB host 110 in the OUT direction (or downstream). USB device 120 may be incapable of successfully exchanging data with USB host 110 in a given direction for various reasons. For the IN direction, USB device 120 may be incapable of sending data to USB host 110 if there is no data to send, if IN buffer 128a is empty or near empty, if processing resources are unavailable at the USB device, etc. For the OUT direction, USB device 120 may be incapable of receiving data from USB host 110 if OUT buffer 128b is full or near full, if processing resources are unavailable at the USB device, if the CPU of the USB device is occupied with other tasks, etc.

For upstream USB transfer in the IN direction, USB device 120 may send a flow off notification for a particular pipe x when USB device 120 does not have any data to send on pipe x to USB host 110. The flow off notification may include information identifying pipe x to USB host 110. USB host 110 may stop requesting for data on pipe x and hence may suspend sending IN token packets for pipe x to USB device 120. When USB device 120 has data available to send on pipe x, USB device 120 may send a flow on notification for pipe x to USB host 110. The flow on notification may include information identifying pipe x to USB host 110. USB host 110 may then resume sending IN token packets for pipe x to USB device 120.

An upstream USB transfer on pipe x may be incomplete at the time the flow off notification was sent for pipe x. In this case, USB device 120 may resume the upstream USB transfer and continue from where it was left off upon sending the flow on notification. Alternatively, USB device 120 may restart the upstream USB transfer from the beginning and retransmit the portion that was sent prior to the flow off notification.

For downstream USB transfer in the OUT direction, USB device 120 may send a flow off notification for a particular pipe x when USB device 120 determines that it is unable to receive data on pipe x from USB host 110. For example, OUT buffer 128b at USB device 120 may be full or near full, and USB device 120 may be unable to receive new data at that moment or shortly thereafter. The flow off notification may include information identifying pipe x to USB host 110. USB host 110 may stop sending data on pipe x and hence may suspend sending OUT or PING token packets for pipe x to USB device 120. When USB device 120 is again able to receive data on pipe x, USB device 120 may send a flow on notification for pipe x to USB host 110. The flow on notification may include information identifying pipe x to USB host 110. USB host 110 may then start sending data on pipe x and hence may resume sending OUT or PING token packets for pipe x to USB device 120.

A downstream USB transfer on pipe x may be incomplete at the time the flow off notification was sent for pipe x. In this case, then USB host 110 may resume the downstream USB transfer and continue from where it was left off upon receiving the flow on notification. Alternatively, USB host 110 may restart the downstream USB transfer from the beginning and retransmit the portion that was sent prior to the flow off notification.

The flow off and flow on notifications may be sent in various manners, e.g., using existing USB messages or new USB messages. In one design, an existing ConnectionSpeedChange notification message defined in a USB Class Definition for Communication Devices is used to convey the flow off and flow on notifications. In this design, a connection speed value of zero may be used to convey the flow off notification and a non-zero value may be used to convey the flow on notification (and possibly the allowable data rate). The ConnectionSpeedChange notification message may be sent on the interrupt pipe. The flow off and flow on notifications may also be conveyed in other existing USB message or a new USB message defined for this purpose.

In one design, the flow off and flow on notifications are sent on an interrupt pipe, which is always available while USB device 120 is connected to USB host 110. The interrupt pipe operates in similar manner as a data pipe. However, the bus access period may be much slower for the interrupt pipe than the data pipe, e.g., on the order of milliseconds for the interrupt pipe and on the order of microseconds for a full-speed or high-speed data pipe. Hence, USB host 110 may send token packets at a much slower rate for the interrupt pipe than the data pipe. Whenever USB device 120 receives an IN token packet for the interrupt pipe, USB device 120 may send a flow control notification message, a NAK handshake packet, or some other packet on the interrupt pipe to USB host 110. A flow control notification may be a flow off notification or a flow on notification.

Figure 4:
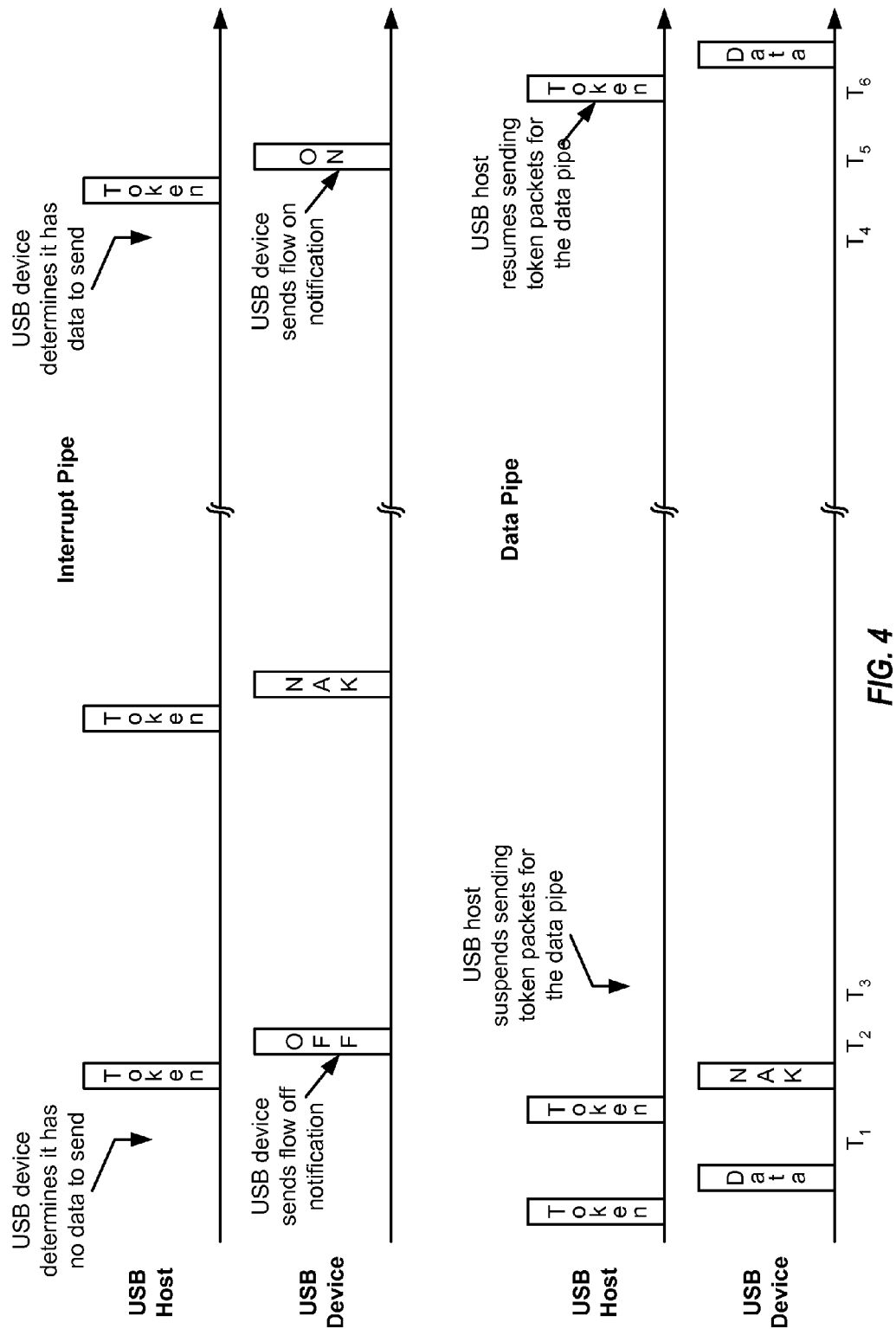
FIG. 4 shows flow control for USB using notifications sent on an interrupt pipe.

FIG. 4 shows a design of flow control for USB using notifications sent on an interrupt pipe. In general, flow control may be performed for the IN direction and/or the OUT direction. In the example shown in FIG. 4, USB device 120 has an interrupt pipe and a data pipe, both of which are for the IN direction.

USB host 110 may periodically send IN token packets for the data pipe to USB device 120. USB device 120 may respond to each IN token packet by sending either an ACK handshake packet and a data packet or a NAK handshake packet to USB host 110. At time $T_1$, USB device 120 determines that it has no data to send on the data pipe to USB host 110. USB device 120 then waits for the next IN token packet for the interrupt pipe and, at time $T_2$, sends a flow off notification message on the interrupt pipe to USB host 110. USB host 110 receives the flow off notification and, starting at time $T_3$, suspends sending IN token packets for the data pipe. USB host 110 may periodically send IN token packets for the interrupt pipe, which may be NAK'ed by USB device 120.

At time $T_4$, USB device 120 determines that it has data to send on the data pipe to USB host 110. USB device 120 then waits for the next IN token packet for the interrupt pipe and, at time $T_5$, sends a flow on notification message on the interrupt pipe to USB host 110. USB host 110 receives the flow on notification and, starting at time $T_6$, resumes sending IN token packets for the data pipe.

As shown in FIG. 4, NAK'ed transactions on the data pipe may be reduced or avoided by sending the flow off notification upon determining that there is no data to send on the data pipe. The bandwidth saved by avoiding NAK'ed transactions on the data pipe may be used for other pipes sharing the USB wire connected to USB host 110.

As shown in FIG. 4, USB device 120 may or may not send a flow control notification whenever an IN token packet is received for the interrupt pipe. Hence, some transactions on the interrupt pipe may be NAK'ed. However, the transaction rate for the interrupt pipe may be much lower than the transaction rate for the data pipe. Hence, much less USB bandwidth may be wasted due to NAK'ed transactions on the interrupt pipe than NAK'ed transactions on the data pipe. Furthermore, the bus access period for the interrupt pipe may be selected to obtain the desired response time for sending notifications while reducing overhead due to NAK'ed transactions.

In the design shown in FIG. 4, USB device 120 is able to send a flow control notification after receiving an IN token packet for the interrupt pipe, instead of at any time. Furthermore, there may be some delay from the time that USB host 110 receives a flow off notification to the time that transactions are suspended on the data pipe. USB device 120 may send flow control notifications in a manner to account for the bus access period of the interrupt pipe and the delay of USB host 110. For a data pipe in the OUT direction, USB device 120 may continue to receive data from USB host 110 until OUT transactions are suspended. USB device 120 may reserve some capacity in OUT buffer 128b in order to avoid NAK'ing OUT transactions during the interim period between the time that the flow off notification is sent to the time that USB host 110 suspends OUT transactions on the data pipe. The amount of reserved buffer capacity may be determined based on the expected length of the interim period, the maximum or average data rate for the data pipe, etc.

In the design shown in FIG. 4, flow control is performed based solely on flow off and flow on notifications. In another design, flow control is performed based on data rate, in addition to or in lieu of the flow off and flow on notifications. USB device 120 may send the data rate to USB host 110, which may then send token packets such that the data rate can be achieved. In yet another design, flow control is performed based on buffer size, which is indicative of the amount of data available to send. USB host 110 may send token packets at a rate determined based on the buffer size. In yet another design, flow control is performed based on token rate, in addition to or in lieu of the flow off and flow on notifications. USB host 110 may send token packets at the token rate to USB device 120. In general, flow control may be performed based on any of the parameters listed above (e.g., flow off and flow on notifications, data rate, buffer size, token rate, control duration, etc.) and/or other parameters.

Figure 5:
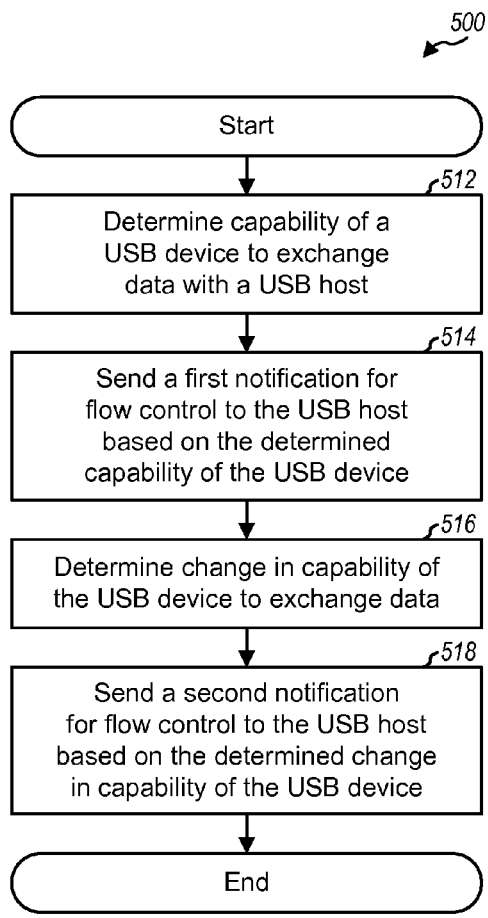
FIG. 5 shows a process performed by the USB device for flow control.

FIG. 5 shows a design of a process 500 performed by a USB device for flow control. The capability of the USB device to exchange data with a USB host may be determined (block 512). A first notification for flow control may be sent to the USB host based on the determined capability of the USB device (block 514). A change in capability of the USB device to exchange data may be determined (block 516). A second notification for flow control may be sent to the USB host based on the determined change in capability of the USB device (block 518). The notifications for flow control may be sent for a particular pipe among multiple pipes between the USB device and the USB host.

For blocks 512 to 518, a determination may be made that the USB device is incapable of exchanging data with the USB host. A flow off notification may be sent to the USB host to suspend data exchanges. Thereafter, a determination may be made that the USB device is capable of exchanging data with the USB host. A flow on notification may be sent to the USB host to resume data exchanges. The flow off and flow on notifications may correspond to the first and second notifications, respectively.

For a pipe in the IN direction, a determination may be made that the USB device is incapable of sending data to the USB host, e.g., because there is no data to send. A flow off notification may be sent to the USB host, which may then suspend sending IN token packets to the USB device. Thereafter, a determination may be made that the USB device is capable of sending data to the USB host. A flow on notification may be sent to the USB host, which may then resume sending IN token packets to the USB device.

For a pipe in the OUT direction, a determination may be made that the USB device is incapable of receiving data from the USB host, e.g., because a buffer at the USB device is full or near full. A flow off notification may be sent to the USB host, which may then suspend sending OUT or PING token packets to the USB device. Some reserved buffer capacity may be used to account for delay by the USB host in suspending OUT or PING token packets after receiving the flow off notification. Thereafter, a determination may be made that the USB device is capable of receiving data from the USB host. A flow on notification may be sent to the USB host, which may then resume sending OUT or PING token packets to the USB device.

The notifications for flow control may be sent on an interrupt pipe to the USB host. An IN token packet for the interrupt pipe may be received from the USB host, and a notification for flow control may be sent on the interrupt pipe after receiving the IN token packet.

Figure 6:
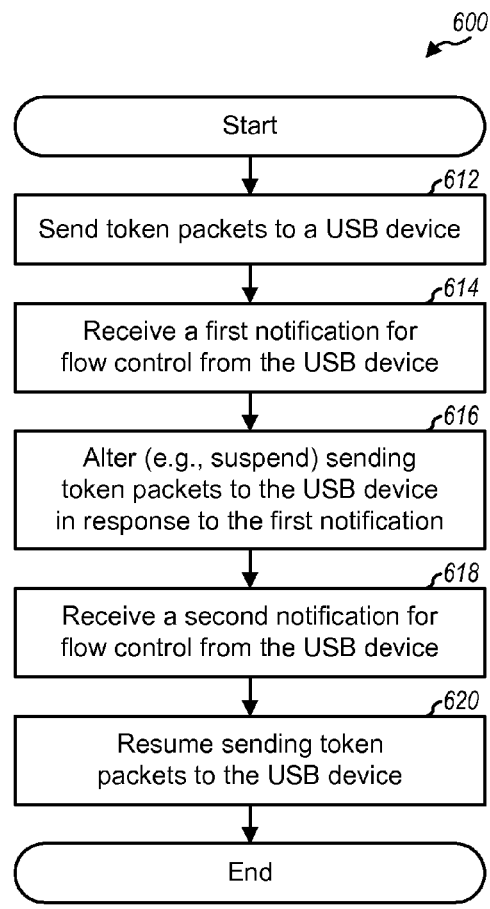
FIG. 6 shows a process performed by the USB host for flow control.

FIG. 6 shows a design of a process 600 performed by a USB host for flow control. Token packets may be sent to a USB device to initiate data exchanges with the USB device (block 612). These token packets may be IN token packets that request for data from the USB device or OUT or PING token packets that indicate data to send to the USB device. A first notification for flow control may be received from the USB device (block 614). The USB host may alter sending token packets to the USB device in response to the first notification (block 616). For example, the USB host may suspend sending token packets or may send token packets at a slower rate. Thereafter, a second notification for flow control may be received from the USB device (block 618). The USB host may resume sending token packets to the USB device (block 620).

The token packets and the notifications may be for a particular pipe among multiple pipes between the USB device and the USB host. The notifications may be received on an interrupt pipe from the USB device. IN token packets for the interrupt pipe may be sent in accordance with a bus access period. The notifications may be received after the IN token packets for the interrupt pipe.

The flow control techniques described herein may be implemented with device-initiated higher-level flow control. The techniques may be implemented within current USB specification using existing message(s) to send flow control notifications. The techniques may be implemented by modifying higher-layer drivers at the USB host and the USB device, which may simplify implementation.

The flow control techniques described herein may provide certain advantages. First, NAK'ed transactions may be reduced or avoided with flow control. The saved bandwidth may be re-allocated to other pipes, which may then improve overall data throughput over the USB wire. Second, overall power efficiency may be improved for the USB device and the USB host.

The flow control techniques described herein may be used for USB hosts and USB devices that are commonly used for computers, wireless communication devices, and other electronics devices. The use of the techniques for a wireless device is described below.

Figure 7:
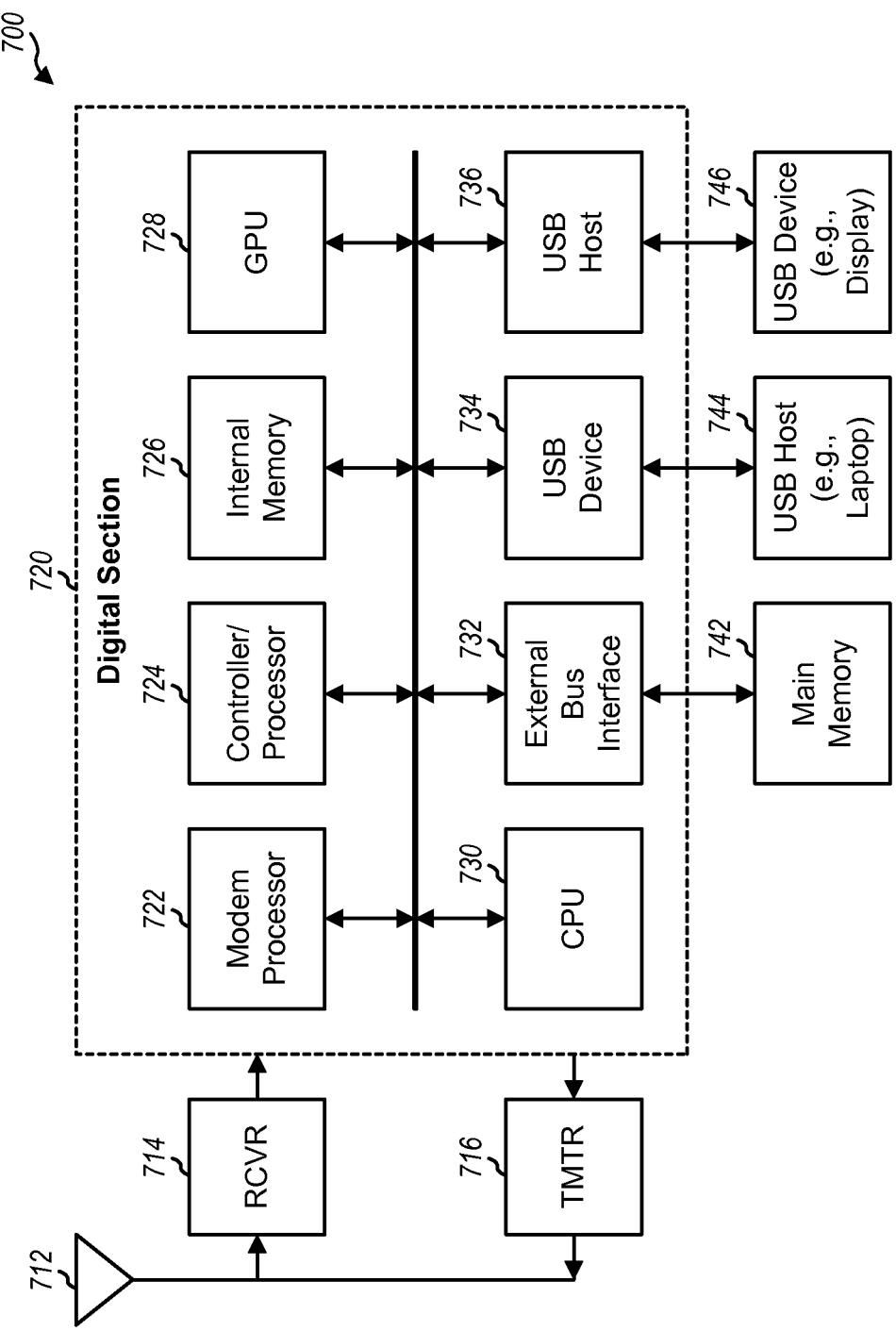
FIG. 7 shows a block diagram of a wireless communication device.

FIG. 7 shows a block diagram of a design of a wireless communication device 700 in a wireless communication system. Wireless device 700 may be a cellular phone, a terminal, a handset, a PDA, etc. The wireless communication system may be a Code Division Multiple Access (CDMA) system, a Global System for Mobile Communications (GSM) system, etc.

Wireless device 700 is capable of providing bi-directional communication via a receive path and a transmit path. On the receive path, signals transmitted by base stations (not shown in FIG. 7) are received by an antenna 712 and provided to a receiver (RCVR) 714. Receiver 714 conditions and digitizes the received signal and provides samples to a digital section 720 for further processing. On the transmit path, a transmitter (TMTR) 716 receives data to be transmitted from digital section 720, processes and conditions the data, and generates a modulated signal, which is transmitted via antenna 712 to the base stations.

Digital section 720 includes various processing, interface, and memory units such as, for example, a modem processor 722, a controller/processor 724, an internal memory 726, a graphics processing unit (GPU) 728, a central processing unit (CPU) 730, an external bus interface (EBI) 732, a USB device 734, and a USB host 736. Modem processor 722 may perform processing for data transmission and reception, e.g., encoding, modulation, demodulation, and decoding. Controller/processor 724 may direct the operation of various units within digital section 720. Internal memory 726 may store data and/or instructions for various units within digital section 720. GPU 728 may perform processing for graphics, images, videos, texts, etc. CPU 730 may perform general-purpose processing for various applications at wireless device 700. EBI 732 may facilitate transfer of data between digital section 720 (e.g., internal memory 726) and a main memory 742. USB device 734 may communicate with a USB host 744, which may reside in a laptop computer or some other electronics device. USB host 736 may communicate with a USB device 746, which may be a display unit, a speaker, a webcam, etc. USB device 734 and/or USB host 736 may implement the flow control techniques described herein.

Digital section 720 may be implemented with one or more processors. Digital section 720 may also be fabricated on one or more application specific integrated circuits (ASICs) and/or some other type of integrated circuits (ICs).

The flow control techniques described herein may be implemented by various means. For example, these techniques may be implemented in hardware, firmware, software, or a combination thereof. For a hardware implementation, the processing units used to perform flow control at a USB host or a USB device may be implemented within one or more ASICs, digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the flow control techniques may be implemented with modules (e.g., procedures, functions, etc.) that perform the functions described herein. The firmware and/or software instructions may be stored in a memory (e.g., memory 726 or 742 in FIG. 7) and executed by a processor (e.g., processor 724). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
    a processor to:
        determine a capability of a Universal Serial Bus (USB) device to exchange data with a USB host at a future time based, at least in part, on a buffer capacity,
        at a selected time prior to the future time send a first notification for flow control to the USB host based on the determined capability of the USB device,
        receive token packets at a slower rate from the USB host in response to the first notification following an interim period of time that begins with the selected time and ends prior to the future time or at the future time,
        at a second selected time subsequent to the future time, send a second notification for flow control to the USB host in response to a determination that the capability of the USB device to exchange data with the USB host has changed based, at least in part, on the buffer capacity, and
        receive additional token packets at a rate that is different from the slower rate from the USB host in response to the second notification, and wherein no other notifications for flow control are sent by the USB device to the USB host between the selected time and the second selected time; and
    a memory coupled to the processor.

2. The apparatus of claim 1, the processor to further send the first notification for flow control for a particular pipe among a plurality of pipes between the USB device and the USB host.

3. The apparatus of claim 1, the processor to further determine that the USB device is incapable of exchanging data with the USB host, and to send a flow off notification to the USB host to suspend data exchanges.

4. The apparatus of claim 3, wherein after sending the flow off notification, the processor to further determine that the USB device is capable of exchanging data with the USB host, and to send a flow on notification to the USB host to resume data exchanges.

5. The apparatus of claim 1, the processor to further determine that the USB device has no data to send to the USB host, wherein the future usage of the USB includes sending no data to the USB host.

6. The apparatus of claim 5, the processor to further send a flow off notification to facilitate decreasing the rate of attempts from the USB host to exchange with the USB device.

7. The apparatus of claim 6, wherein after sending the flow off notification, the processor to further determine that the USB device is capable of sending data to the USB host, and to send a flow on notification to the USB host, and wherein the USB host resumes sending IN token packets to the USB device in response to the flow on notification.

8. The apparatus of claim 1, the processor to further determine that the USB device is incapable of receiving data from the USB host, and to send a flow off notification to the USB host, and wherein the USB host suspends sending OUT or PING token packets to the USB device in response to the flow off notification.

9. The apparatus of claim 8, the processor to further determine that the USB device is incapable of receiving data from the USB host when a buffer at the USB device is full or within a predetermined amount of being full.

10. The apparatus of claim 8, the processor to further determine that the USB device is incapable of receiving data from the USB host when a buffer at the USB device is within a predetermined amount of being full, the predetermined amount corresponding to reserved buffer capacity to account for delay by the USB host in suspending the OUT or PING token packets after receiving the flow off notification.

11. The apparatus of claim 8, wherein after sending the flow off notification, the processor to further determine that the USB device is capable of receiving data from the USB host, and to send a flow on notification to the USB host, and wherein the USB host resumes sending OUT or PING token packets to the USB device in response to the flow on notification.

12. The apparatus of claim 1, the processor to further send at least one of:
    the first notification for flow control or the second notification for flow control on an interrupt pipe to the USB host.

13. The apparatus of claim 12 the processor to further receive an IN token packet for the interrupt pipe from the USB host, and to send the first notification for flow control on the interrupt pipe after receiving the IN token packet.

14. A method comprising: with a Universal Serial Bus (USB) device:
    determining a capability of the USB device to exchange data with a USB host at a future time based, at least in part, on a buffer capacity;
    at a selected time prior to the future time, sending a first notification for flow control to the USB host based on the determined capability of the USB device;
    receiving token packets at a slower rate from the USB host in response to the first notification following an interim period of time that begins with the selected time and ends prior to the future time or at the future time;

at a second selected time subsequent to the future time, sending a second notification for flow control to the USB host in response to a determination that the capability of the USB device to exchange data with the USB host has changed based, at least in part, on the buffer capacity; and receiving additional token packets at a rate that is different from the slower rate from the USB host in response to the second notification, and wherein no other notifications for flow control are sent by the USB device to the USB host between the selected time and the second selected time.

15. The method of claim 14, wherein the determining capability of the USB device comprises determining that the USB device is incapable of exchanging data with the USB host, and wherein the sending the first notification for flow control comprises sending a flow off notification to the USB host to suspend data exchanges.

16. The method of claim 15, after determining that the USB device is incapable of exchanging data with the USB host, further comprising, with the USB device:
  determining that the USB device is capable of exchanging data with the USB host; and
  sending a flow on notification to the USB host to resume data exchanges.

17. The method of claim 14, wherein the sending the first notification for flow control comprises sending the first notification for flow control on an interrupt pipe to the USB host.

18. An apparatus for use in a Universal Serial Bus (USB) device, the apparatus comprising:
  means for determining a capability of the USB device to exchange data with a USB host at a future time based, at least in part, on a buffer capacity;
  means for sending, at a selected time prior to the future time, a first notification for flow control to the USB host based on the determined capability of the USB device;
  means for receiving token packets at a slower rate from the USB host in response to the first notification following an interim period of time that begins with the selected time and ends prior to the future time or at the future time;
  means for sending, at a second selected time subsequent to the future time, a second notification for flow control to the USB host in response to a determination that the capability of the USB device to exchange data with the USB host has changed based, at least in part, on the buffer capacity; and
  means for receiving additional token packets at a rate that is different from the slower rate from the USB host in response to the second notification, and wherein no other notifications for flow control are sent by the USB device to the USB host between the selected time and the second selected time.

19. An article comprising:
a processor-readable storage medium having stored therein computer-executable instructions executable by a processor of a Universal Serial Bus (USB) device to:
  determine a capability of the USB device to exchange data with a USB host at a future time based, at least in part, on a buffer capacity;
  at a selected time prior to the future time, send a first notification for flow control to the USB host based on the determined capability of the USB device;
  receive token packets at a slower rate from the USB host in response to the first notification following an interim period of time that begins with the selected time and ends prior to the future time or at the future time;
  at a second selected time subsequent to the future time, send a second notification for flow control to the USB host in response to a determination that the capability of the USB device to exchange data with the USB host has changed based, at least in part, on the buffer capacity; and
  receive additional token packets at a rate that is different from the slower rate from the USB host in response to the second notification, and wherein no other notifications for flow control are sent by the USB device to the USB host between the selected time and the second selected time.

20. An apparatus comprising:
a processor to:
  send token packets to a Universal Serial Bus (USB) device at a first rate;
  receive a first notification for flow control from the USB device, the first notification for flow control having been sent by the USB device at a selected time in advance of a future time that is based, at least in part, on a buffer capacity at the USB device;
  beginning prior to the future time or at the future time, send subsequent token packets to the USB device at a second rate that is slower than the first rate in response to the first notification;
  at a second selected time subsequent to the future time, receive a second notification for flow control from the USB device, the second notification for flow control having been sent by the USB device in response to a determination that the capability of the USB device to exchange data with the USB host has changed based, at least in part, on the buffer capacity; and
  subsequently send additional token packets to the USB device at a rate that is different from the second rate in response to the second notification, and wherein no other notifications for flow control are received from the USB device between the selected time and the second selected time; and
a memory coupled to the processor.

21. The apparatus of claim 20, wherein the token packets and the first notification are for a particular pipe among a plurality of pipes between the USB device and a USB host.

22. The apparatus of claim 20, wherein the rate that is different from the second rate comprises the first rate.

23. The apparatus of claim 20, the processor to further send IN token packets to the USB device to request data from the USB device.

24. The apparatus of claim 20, the processor to further send OUT or PING token packets to the USB device to indicate data to send to the USB device.

25. The apparatus of claim 20, the processor to further send token packets for a data pipe to the USB device, and to receive the first notification on an interrupt pipe from the USB device.

26. The apparatus of claim 25, the processor to further send IN token packets for the interrupt pipe in accordance with a selected bus access period, and to receive the first notification for flow control after one of the IN token packets sent for the interrupt pipe.

27. A method comprising, with a Universal Serial Bus (USB) host:
  sending token packets to a USB device at a first rate;
  receiving a first notification for flow control from the USB device, the first notification for flow control having been sent by the USB device at a selected time in advance of a future time that is based, at least in part, on a buffer capacity at the USB device;

sending, beginning prior to the future time or at the future time, subsequent token packets to the USB device at a second rate that is slower than the first rate in response to the first notifications;

at a second selected time subsequent to the future time, receiving a second notification for flow control from the USB device, the second notification for flow control having been sent by the USB device in response to a determination that the capability of the USB device to exchange data with the USB host has changed based, at least in part, on the buffer capacity; and subsequently sending additional token packets to the USB device at a rate that is different from the second rate in response to the second notification, and wherein no other notifications for flow control are received from the USB device between the selected time and the second selected time.

28. The method of claim 27, wherein the rate that is different from the second rate comprises the first rate.

29. The method of claim 27, wherein the receiving the first notification for flow control comprises receiving the first notification for flow control on an interrupt pipe from the USB device.

30. An apparatus for use in a Universal Serial Bus (USB) host, the apparatus comprising:

means for sending token packets to a USB device at a first rate;

means for receiving a first notification for flow control from the USB device, the first notification for flow control having been sent by the USB device at a selected time in advance of a future time that is based, at least in part, on a buffer capacity at the USB device;

means for sending, beginning prior to the future time or at the future time, subsequent token packets to the USB device at a second rate that is slower than the first rate in response to the first notification;

means for receiving, at a second selected time subsequent to the future time, a second notification for flow control from the USB device, the second notification for flow control having been sent by the USB device in response to a determination that the capability of the USB device to exchange data with the USB host has changed based, at least in part, on the buffer capacity; and means for subsequently sending additional token packets to the USB device at a rate that is different from the second rate in response to the second notification, and wherein no other notifications for flow control are received from the USB device between the selected time and the second selected time.

31. The apparatus of claim 30, wherein the rate that is different from the second rate comprises the first rate.

32. An article comprising:

a processor-readable storage medium having stored therein computer-executable instructions executable by a processor of a Universal Serial Bus (USB) host to:

send token packets to a USB device at a first rate;

receive a first notification for flow control from the USB device, the first notification for flow control having been sent by the USB device at a selected time in advance of a future time that is based, at least in part, on a buffer capacity at the USB device;

beginning prior to or at the future time, send subsequent token packets to the USB device at a second rate that is lower than the first rate in response to the first notification;

at a second selected time subsequent to the future time, receive a second notification for flow control from the USB device, the second notification for flow control having been sent by the USB device in response to a determination that the capability of the USB device to exchange data with the USB host has changed based, at least in part, on the buffer capacity; and subsequently send additional token packets to the USB device at a rate that is different from the second rate in response to the second notification, and wherein no other notifications for flow control are received from the USB device between the selected time and the second selected time.

33. The article of claim 32, wherein the rate that is different from the second rate comprises the first rate.

* * * * *